Feb. 10, 1970    R. J. KOBIELLA    3,494,280
TORSION BAR SEALING MECHANISM
Filed June 10, 1968    2 Sheets-Sheet 1
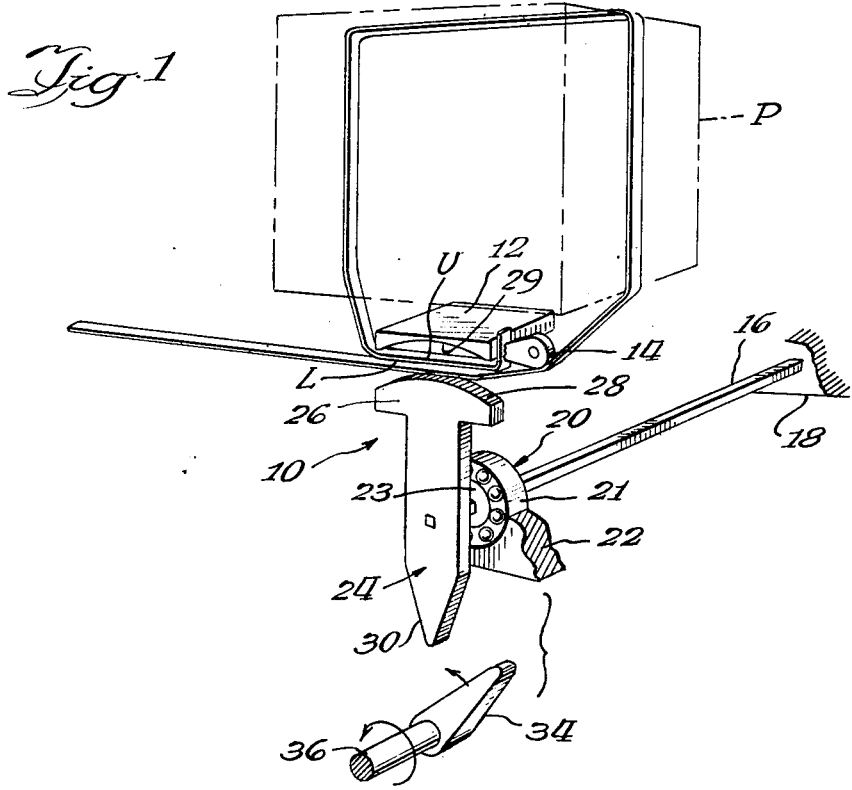
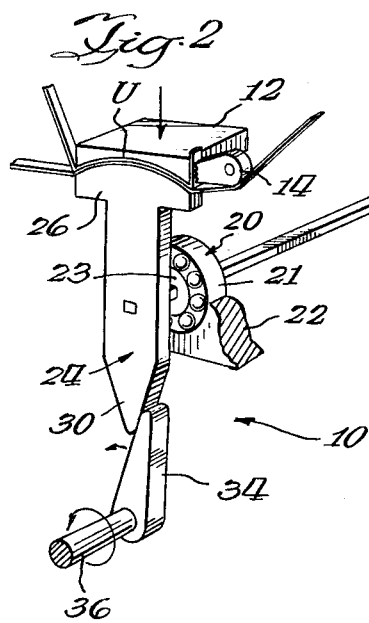
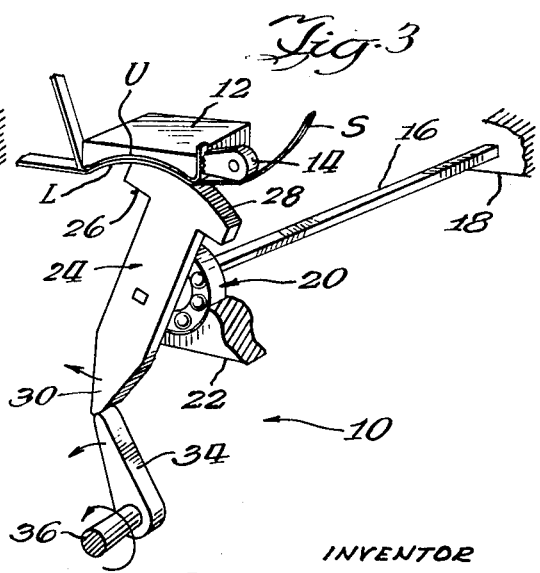
INVENTOR
Robert Kobiella
BY Dressler, Goldsmith, Clement & Gordon
ATTORNEYS

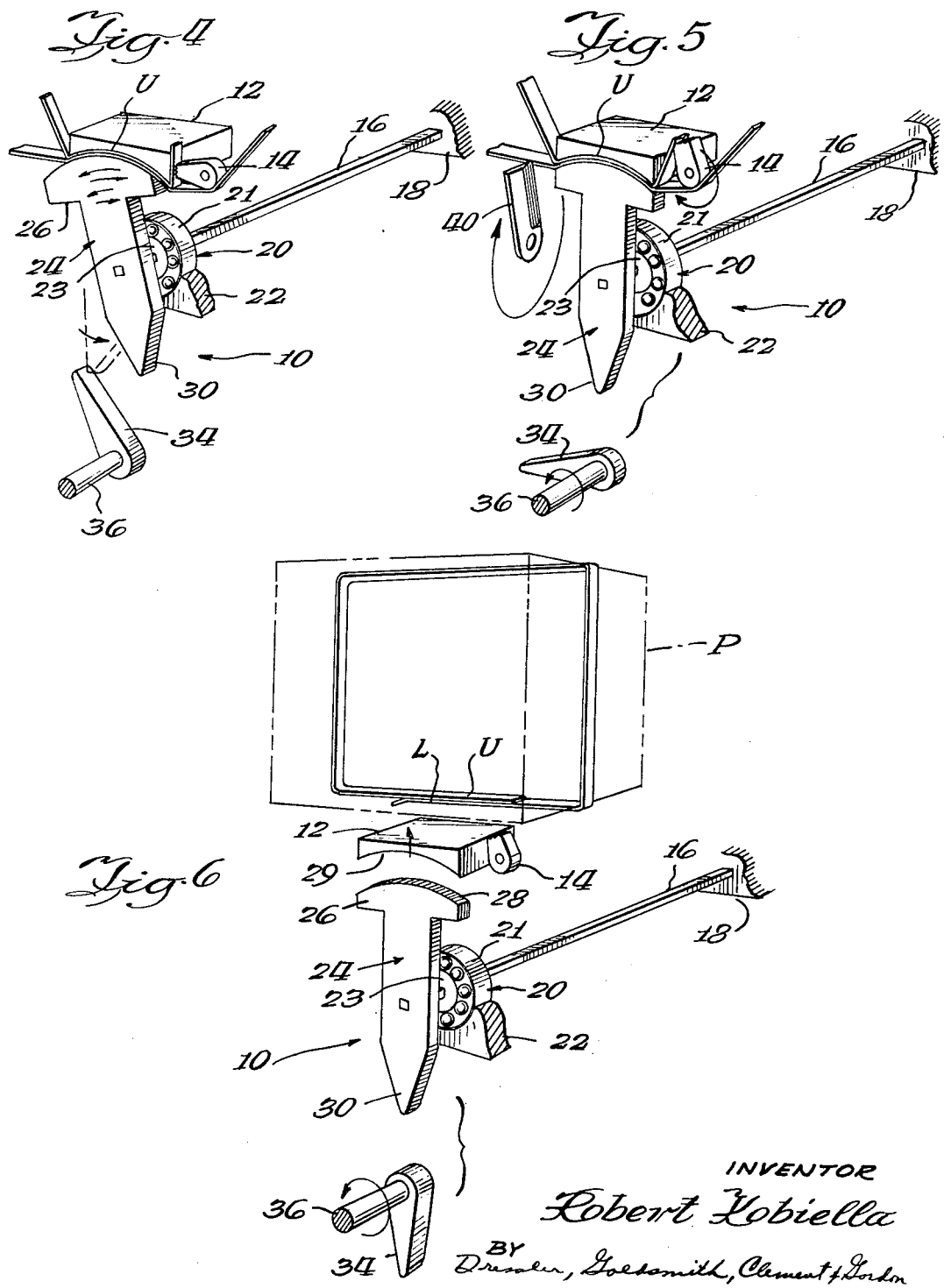

United States Patent Office 3,494,280
Patented Feb. 10, 1970

3,494,280
TORSION BAR SEALING MECHANISM
Robert J. Kobiella, Rolling Meadows, Ill., assignor to Signode Corporation, a corporation of Delaware
Filed June 10, 1968, Ser. No. 735,842
Int. Cl. B65b *13/02, 13/24*
U.S. Cl. 100—2                                10 Claims

ABSTRACT OF THE DISCLOSURE

An apparatus and method for friction-fusing overlapping portions of thermoplastic strapping wherein the strap portions are compressed between arcuate surfaces on an anvil and a hammer, and the hammer is moved against the bias of a torsion spring to a release position by a cocking cam, whereupon the hammer is released for oscillatory movement by the torsion spring to cause bodily sliding frictional movement between the overlapping strap portions to melt the interface regions therebetween.

BACKGROUND OF THE INVENTION

This invention relates to an apparatus and a method for friction-fusing overlapping portions of plastic strapping to form a joint therebetween. As used herein, plastic refers to heat fusible materials, natural or synthetic, which are relatively soft compared to steel and which may be formed into an elongated configuration having necessary elastic or resilient properties enabling the same to conform to the shape of an object which it encircles. In particular, plastic strap formulated from thermoplastic resin material, such as a longitudinally oriented linear polymer, is in current use and represents an important application for the present invention. Typical examples of such material include polypropylene and nylon.

Currently, plastic strapping is being extensively used for binding articles or packages and a number of devices have been developed for forming a joint between the overlapping strap portions to complete a strap loop. In particular, the friction-fusion technique is being utilized in a number of devices wherein the overlapping strap ends are held together under substantial pressure and then moved relative to each other to develop a bodily sliding frictional generation of heat at the interface region. In the existing devices, both hand tools and automatic strapping machines have been devised using a reciprocating mode of movement and using a single stroke mode of movement. It is desirable to provide a simplified sealer assembly capable of effecting the reciprocating type of relative bodily sliding frictional movement.

SUMMARY OF THE INVENTION

This invention relates to a friction-fusion sealer mechanism wherein overlapping strap portions are compressed together between a rigid anvil that serves as a stationary jaw and an oscillating hammer that serves as a movable jaw. Both the anvil and hammer have mating confronting surfaces of arcuate form in the arrangement disclosed herein. A simplified actuating mechanism utilizes a torsion bar principle for supplying all of the energy required for effecting sufficient oscillating movement of the hammer to produce a friction-fused joint.

The disclosed torsion bar arrangement has one end anchored and has the other end supported in a bearing and drivingly connected to the hammer.

According to the invention, the hammer may be cocked to twist the torsion bar to a predetermined extent as determined by the desired amplitude of the reciprocating movement to be imparted to the strap. The spring rate or stiffness of the torsion bar is selected to allow storage of sufficient energy to effect the friction-fusion movement in the presence of substantial pressure acting between the overlapping strap portions.

By this approach, the amplitude, force and energy parameters of the friction-fusion process are built into the torsion bar mechanism and will remain substantially constant over a long period so that effective control of the joint forming operation is achieved.

Torsion bar arrangements are known for their ruggedness and durability and these attributes make the unique application of them to the friction-fusion field highly advantageous. Moreover, torsion bar mechanisms are inherently simple and have well defined limits of swinging movement and automatically re-center so that the mechanism requires no additional controls for acomplishing these features.

In accordance with the present invention, a unique method is disclosed for carrying out a controlled friction-fusion movement, the method comprising storing a predetermined quantum of energy in a substantially frictionless oscillatory system and releasing the system while applying pressure therethrough to create bodily sliding frictional movement between overlapping thermoplastic portions, the movement being naturally damped by the friction acting between the thermoplastic portions to transfer the stored mechanical energy into heat energy effective to melt the interface regions of the thermoplastic portions.

Numerous other advantages and features of the pesent invention will become readily apparent from the following detailed description of the invention and of one embodiment thereof, from the claims, and from the accompanying drawings in which each and every detail shown is fully and completely disclosed as part of this specification, in which like reference numerals refer to like parts, and in which:

BRIEF DESCRIPTION OF THE DRAWINGS

In the accompanying drawings forming a part of the specification, and in which like numerals are employed to designate like parts throughout the same, FIGURE 1 is a perspective front elevational view schematically illustrating a friction-fusion apparatus embodying the principles of this invention, the sealer mechanism being shown in spaced apart position to illustrate the clearance that exists during the formation and tensioning of the loop;

FIGURE 2 is a related schematic view showing the sealer parts positioned in compressing relation upon the overlapping strap portions that are to be friction-fused together; and FIGURES 3 to 6, respectively, are sequence views showing the cocking of the hammer, the oscillating action of the hammer, the damped position of the hammer, and the release position of the parts.

One embodiment of this invention is shown in my concurrently filed application Serial No. 748,698 filed July 30, 1968 entitled Strapping Apparatus and Process, the disclosure of which is specifically incorporated herein in total by this reference.

Referring now to the accompanying drawings for purposes of illustrative disclosure, a simplified embodiment of the invention is indicated in its entirety at 10 and is shown associated with a package P which is located at a strapping position by means of any suitable support framing (not shown). The mechanism 10 is mounted on a suitable frame (not shown) and includes a rigid anvil 12 which is shiftable between the projected positions shown in FIGS. 1 to 5 wherein it intercepts the plane of the strap loop and the retracted position shown in FIG. 6 wherein the strap loop is free to move upwardly into engagement with package P. The means for shifting the anvil 12 may be the same as the means illustrated in my copending application filed concurrently herewith.

Means for gripping the free strap end against the side of the anvil are shown in the form of a pivotally mounted jaw 14 which holds the tip end of the strap so that the adjoining portion is snubbed beneath the anvil. Jaw 14 has a toothed or notched outer end for gripping the leading end of the upper strap portion to fixedly hold the strap against the anvil 12. While jaw 14 has been illustrated as being mounted for pivotal movement relative to the anvil 12, it will be appreciated that the jaw 14 might also be slidable relative to the anvil.

The strap loop is formed and tensioned in any suitable fashion, as for example in the manner described in my concurrently filed copending application, to bring an overlapping lower strap portion L beneath the anvil to underlie the upper strap portion U adjacent the gripped end of the strap. Thereafter, the overlapping strap portions are fused by method and apparatus hereinafter described.

A torsion bar 16 is fixed at one end in a rigid anchorage 18, and the torsion bar extends through a bearing assembly 20 and into a hammer 24. Bearing assembly 20 includes an outer race 21 fixed to a rigid anchorage 22 and an inner race 23 is rotatably retained within the outer race. In the illustrated embodiment, torsion bar 16 is square in cross section and passes through correspondingly shaped openings in inner race 23 and hammer 24, although it will be understood that the torsion bar may have other cross sectional configurations.

In the particular arrangement shown herein, the hammer 24 is situated at the extreme free end of the torsion bar 16, and includes a generally sector shaped head 26 having an arcuate surface 28 curved about a radius from the axis of torsion bar 16. Surface 28 is preferably toothed or notched to enhance its ability to grip the lower strap portion L, as will hereinafter appear. Anvil 12 includes an arcuate lower surface 29 that is in alignment with the curved upper surface 28 of the hammer 24 in the positions of FIGS. 1–5, and the anvil surface 29 is also curved about a radius from the axis of torsion bar 16 so as to be shaped complementarily with the hammer surface 28. Anvil surface 29 is also toothed to enhance its ability to grip the upper strap U. It will be appreciated that the complementary shaping of the curved hammer and anvil surfaces 28 and 29, respectively, allows the overlapping strap portions U and L to be uniformly compressed therebetween.

The hammer 24 further includes a downwardly tapered, wedge-shaped depending tang portion 30 which intercepts the swing periphery of a cocking cam 34 that is shown located therebeneath. Cocking cam 34 is mounted for rotation with a shaft 36, and in the illustrated embodiment, cam 34 has a tapered, generally wedge-like configuration.

Normally, the torsion bar 16 assumes its neutral position, as shown in FIG. 1, for which the hammer is centered beneath the anvil 12 with hammer surface 28 behind anvil surface 29. The anchorage 18, 22 then can be shifted to move the torsion bar into working position wherein the hammer 24 compresses the overlapping strap portions U and L, as shown in FIG. 2. The drive shaft 36 for the cocking cam 34, as represented here, is synchronized with the mechanism (not shown) which positions the torsion bar vertically so that the cocking cam will engage the depending tang 30 of the hammer only after the hammer is in compressing relation with the overlapping strap portions. Bearing assembly 20 supports the clamping load imposed by anvil 12.

Continued movement of the cocking cam 34 pivots the hammer 24 in a clockwise direction to the position of FIG. 3 wherein the torsion bar 16 is twisted and fully stressed, this position determining the amplitude and the amount of energy stored in the torsion bar. As is evident from FIG. 3, during the clockwise pivotal movement of hammer 24, the toothed surface 28 thereon carries the lower strap portion L to the right to create a slack S. The shape of cam 34 is related to the shape of the hammer tang portion 30 in a manner such that the torsion bar 16 is stressed to a magnitude to store enough to allow the interface regions between the overlapping strap portions to melt when the cam is rotated to the hammer releasing position of FIG. 4. It has been determined that 500–750 inch pounds of torque is sufficient to effect interface melting with materials of the previously described type of ¼" width.

Further rotation of the cam 34, as shown in FIG. 4, releases the hammer for free swinging oscillation, with the hammer teeth causing the lower overlapping strap portion to move with the hammer and provide relative bodily sliding movement between the contacting faces of the strap portions U and L. Due to the pressure acting between the strap portions, there is a frictional generation of heat at the interface regions causing melting of the plastic surfaces as the hammer swings the strap portion L back and forth through several cycles of oscillation.

After the hammer has come to rest it holds the melted joint together long enough to accomplish fusion at the interface. Thereafter, a cutter 40 is actuated, as shown in FIG. 5, to sever the supply end of the strap and the anchorage 18, 22 is shifted vertically to move the hammer away from the anvil. As shown herein, it is contemplated that the anchorage may move in a translational fashion in the vertical direction; however, in the aforesaid application, the torsional system is on a swingably mounted carriage which pivots to bring the hammer between rest and working positions. Alternatively, the anvil can be shifted to provide the spacing that is desired.

What is claimed is:

1. A method for securing a thermoplastic strap around a package or the like comprising:
   forming a length of strap into a loop around the package to provide overlapping upper and lower strap portions;
   compressing said overlapping strap portions against one another;
   storing a predetermined amount of energy in a pendulous-like oscillating spring system; and
   releasing said spring system and utilizing said energy to effect bodily sliding frictional movement between contacting surface regions of the overlapping strap portions to melt the interface regions and cause a bonding therebetween.

2. The method of claim 1 wherein said energy is stored by twisting a torsion bar spring a predetermined angular amount.

3. The method of claim 1 wherein a slack is drawn in said loop prior to releasing said spring system.

4. A method for securing a thermoplastic strap around a package or the like comprising:
   forming a length of strap into a loop around the package to provide overlapping upper and lower strap portions;
   clamping the end of the upper strap portion to an anvil;
   effecting relative movement between the anvil and a hammer to compress the overlapped strap portions therebetween;
   pivoting the hammer against the bias of a torsion bar to draw slack in the lower portion of the strap;
   releasing the hammer so that the torsion bar will oscillate the hammer and move the lower strap portion relative to the upper strap portion to create a bodily sliding frictional movement between contacting surface regions of the overlapping strap portions, the movement being gradually damped through the action of the torsion bar and the friction created by the relative movement between the overlapping strap portions being effective to melt the interface regions of the overlapping strap portions; and
   effecting relative movement between the anvil and hammer after a pause sufficient to allow the melted interface regions to solidify to allow the completed loop to move into engagement with the package.

5. Apparatus for securing a thermoplastic strap around a package or the like comprising:
   first and second members for compressing overlapping strap portions therebetween;
   torsion bar means connected with said first member for oscillating said first member relative to said second member;
   means for stressing said torsion bar to store a predetermined amount of energy; and
   means for releasing said torsion bar after said predetermined amount of energy has been stored to oscillate said first member and cause bodily sliding frictional movement between the overlapping strap portions to melt the interface regions therebetween.

6. Apparatus as set forth in claim 5 wherein said first and second members have mating, generally complementarily shaped arcuate strap engaging surfaces.

7. Apparatus as set forth in claim 5 wherein said torsion bar means includes a support, and a torsion bar having one end fixed to said support and the other end free to twist relative to said support.

8. Apparatus as set forth in claim 7 wherein said torsion bar stressing means includes a hammer fixed to said torsion bar other end, and a cam movable into engagement with said hammer.

9. Apparatus as set forth in claim 8 wherein said torsion bar releasing means is defined by shaped abutment surfaces on said cam and said hammer.

10. Apparatus for securing a thermoplastic strap around a package or the like comprising:
    support structure;
    a torsion bar having one end fixed in said support structure and the other end free to twist relative to said support structure;
    a hammer fixed to said other torsion bar end, said hammer having an arcuate strap engaging surface at one end thereof and an abutment surface at the other end thereof;
    an anvil normally positioned in spaced relation with respect to said hammer, said anvil having an arcuate strap engaging surface, the curvature of said anvil surface being generally complementary with the curvature of said arcuate hammer surface;
    a gripper adjacent said anvil for holding the leading end of a strap against the anvil;
    means for effecting relative movement between said anvil and hammer to compress overlapping strap portions therebetween; and
    a cocking cam mounted for movement relative to said hammer, said cam having an abutment thereon movable into engagement with the hammer abutment surface to pivot the hammer against the bias of said torsion bar, said cam and hammer abutment surfaces being shaped so that said cam pivots said hammer through a predetermined range for a given movement of the cam, said range being sufficient to stress said torsion bar and draw slack in said strap, said cam and hammer abutment surfaces being further shaped to allow the cam abutment surface to move out of engagement with the hammer abutment surface after said torsion bar is stressed whereby said hammer is released for oscillatory movement by said torsion bar and said arcuate hammer surface effects bodily sliding frictional movement between the overlapping strap portions to melt the interface regions therebetween.

References Cited

UNITED STATES PATENTS 3,269,300    8/1966    Billett et al. _____ 100—18
3,331,312    7/1967    Leslie et al.

BILLY J. WILHITE, Primary Examiner

U.S. Cl. X.R.

53—198; 100—29, 33; 156—73, 580